Apr. 24, 1923. 1,453,095
J. C. ENGSTRAND
PISTON PIN
Filed July 27, 1922
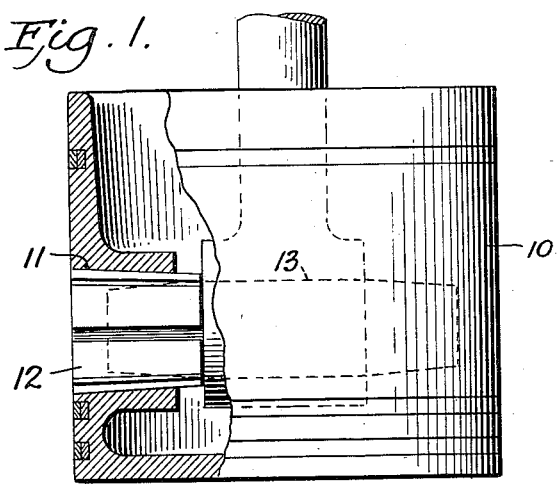
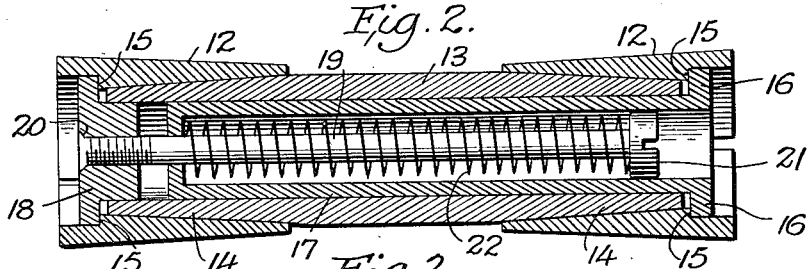
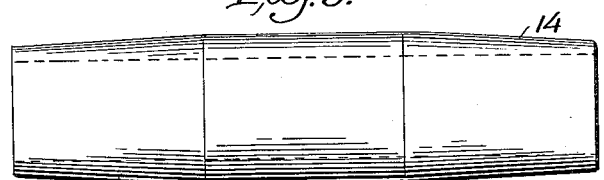
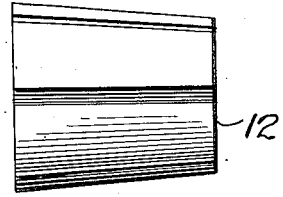
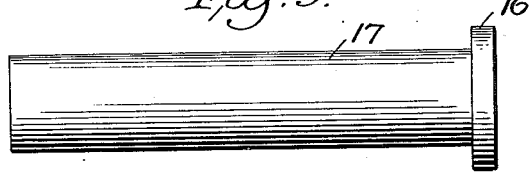
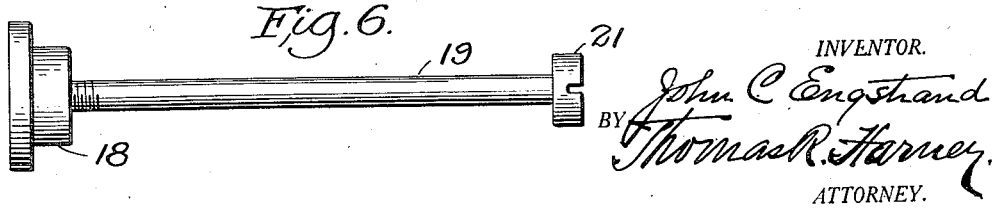
INVENTOR.
John C. Engstrand
BY Thomas R. Harney,
ATTORNEY.

Patented Apr. 24, 1923.

1,453,095

UNITED STATES PATENT OFFICE.

JOHN C. ENGSTRAND, OF CHICAGO, ILLINOIS.

PISTON PIN.

Application filed July 27, 1922. Serial No. 577,903.

*To all whom it may concern:*

Be it known that I, JOHN C. ENGSTRAND, a citizen of the United States of America, residing at Chicago, in the county of Cook and State of Illinois, have invented certain new and useful Improvements in Piston Pins, of which the following is a specification.

My present invention relates generally to piston pins, or what are commonly known as wrist pins, constituting the connection between a piston and its respective connecting rod in a reciprocating piston engine, and my invention relates more particularly to the bearings of pistons or wrist pins, my object being the provision of a pin of this nature having adjustable bearing bushings together with means whereby to automatically take up the bushings and compensate for wear from time to time so as to avoid the necessity of taking down a motor and manually adjusting the wrist pin bearings from time to time.

According to my invention the piston or wrist pin carries a pair of tapered bushings which cooperate with tapered diametrically opposed bearing bores of a piston, and the pin also carries means which automatically act upon the bushings to adjust the latter in the bearing bores and in this way compensate for wear.

In the accompanying drawings which illustrate my present invention and form a part of this specification, Figure 1 is a side view, partly broken away and in section, of a piston in which my improvements are incorporated, Figure 2 is an enlarged central longitudinal section through the complete piston or wrist pin with the adjustable bushings thereon, Figure 3 is a detail side view of the main body of my improved piston or wrist pin, Figure 4 is a similar view of one of the two similar bushings, Figure 5 is another detail side view illustrating the spring holding sleeve, and Figure 6 is a detail side view of the spring bolt and its nut.

Referring now to these figures and particularly to Figure 1 I have shown a piston 10 which is intended as entirely conventional except as to the diametrically opposed bearing bores for the piston or wrist pin, which bores my invention contemplates and proposes of the inwardly and oppositely tapered form indicated at 11 so as to cooperate with similarly shaped though oppositely disposed and externally tapered bushings 12 which are mounted upon opposite ends of the body 13 of the piston or wrist pin and which in operation are disposed within the two bores 11.

The inner surfaces of the bushings 12 are for the major portions of the lengths of these bushings also preferably tapered, the taper being opposite to their external tapered surfaces, the latter of which may be longitudinally grooved as particularly seen in Figure 4, it being understood that these bushings are split so that, in view of their internal tapers which cooperate with the oppositely tapered end portions 14 of the body 13 of the pin, as most plainly seen in Figure 3, it is obvious that the bushings may be actually expanded when pressed inwardly toward one another upon the tapered ends of the pin body. Each of the bushings 12 is furthermore provided adjacent to its larger end with a counterbore forming an outwardly facing annular shoulder 15 and these shoulders 15 are respectively engaged, when the parts are assembled as in Figures 1 and 2, by the external annular flange 16 upon one end of a spring supporting tube 17, and the annularly flanged nut 18 which is threaded upon one end of a spring bolt 19 and which is preferably locked against displacement by virtue of an outer tapered counterbore 20 into which the free end of the spring bolt 19 is, after assembly, displaced as by spinning or a similar operation.

As will be seen in Figures 1 and 2, and particularly in the latter, the body 13 of the piston pin has a lengthwise bore of one diameter throughout and of a size adapting the same to receive the spring supporting tube 17 in movably interfitting relation. The bore of this tube is in turn adapted to slidably receive the head 21 at the inner end of the spring bolt 19, the latter of which is shiftable through the open end of the tube 17 adjacent to its flange 16. The spring bolt 19 is also movable through a small opening in the opposite end of the tube, which latter end is otherwise closed and thus forms an abutment for one end of the spring 22 disposed within the tube and around the bolt 19 and abutting at its opposite end against the bolt head 21 so that it thus becomes obvious that with the parts assembled as in Figure 2, the spring 22 is constantly exerting its tension to shift the outer ends of the sleeve 17 and the spring bolt 19 toward one another, this tension becoming active through engagement of the sleeve flange 16 and the bolt nut 18, engaging the inner annular shoulders 15 of the bushings 20, to press these bushings toward one another at all times.

It is thus obvious that in practice the desired tension will be disposed at all times toward expansion of the bushings so that the increase in diameter of these bushings will correspond at all times to the wear occasioned by the movement of the piston or wrist pin as a whole within the bearings 11 of the piston.

I claim:

1. The combination with a piston having inwardly and oppositely tapered diametrical bearing bores, a wrist pin therein having oppositely tapered bushings mounted upon its opposite ends and disposed within the said bores, and means also supported by the said pin for automatically adjusting the bushings as and for the purpose set forth.

2. The combination with a piston having oppositely tapered diametrical bearing bores, of a wrist pin having oppositely tapered end portions, bushings having tapered inner surfaces seated on the tapered surfaces of the pin and projecting at their outer ends beyond the outer end of the pin, said bushings having outer tapered surfaces within the piston bores, and means extending through the said pin and engaging the said bushings to automatically shift the same toward one another as described.

3. The combination with a piston having oppositely tapered diametrical bearing bores, of a wrist pin having oppositely tapered end portions, bushings having tapered inner surfaces seated on the tapered surfaces of the pin and projecting at their outer ends beyond the outer end of the pin, said bushings having outer tapered surfaces and inner outwardly facing annular shoulders, and spring controlled means mounted through the pin and in engagement with the annular shoulders of the bushings to shift the latter toward one another.

4. The combination with a piston having oppositely tapered diametrical bearing bores, of a wrist pin having oppositely tapered end portions, bushings having tapered inner surfaces seated on the tapered surfaces of the pin and projecting at their outer ends beyond the outer end of the pin, said bushings having outer tapered surfaces and inner outwardly facing annular shoulders, and spring controlled means mounted through the pin and in engagement with the annular shoulders of the bushings to shift the latter toward one another, said means including a spring sleeve, a spring bolt guided by the sleeve, a spring within the sleeve having bearing at one end against the inner end of the sleeve and having bearing at its other end against the inner end of the bolt, said sleeve and said bolt having annularly flanged portions at their outer ends engaging the inner annular shoulders of the bushings.

In testimony whereof I have affixed my signature.

JOHN C. ENGSTRAND.